(12) United States Patent
Takeda

(10) Patent No.: US 12,522,241 B2
(45) Date of Patent: Jan. 13, 2026

(54) INFORMATION PROCESSING DEVICE, PARKING ASSISTANCE DEVICE, AND METHOD

(71) Applicant: Panasonic Intellectual Property Management Co., Ltd., Osaka (JP)

(72) Inventor: Gentaro Takeda, Osaka Fu (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 170 days.

(21) Appl. No.: 18/529,298

(22) Filed: Dec. 5, 2023

(65) Prior Publication Data

US 2024/0116536 A1 Apr. 11, 2024

Related U.S. Application Data

(63) Continuation of application No. PCT/JP2022/019909, filed on May 11, 2022.

(30) Foreign Application Priority Data

Aug. 23, 2021 (JP) ................. 2021-135836

(51) Int. Cl.
*B60W 60/00* (2020.01)
*B60W 50/14* (2020.01)
(Continued)

(52) U.S. Cl.
CPC .......... *B60W 60/001* (2020.02); *B60W 50/14* (2013.01); *G06V 20/52* (2022.01);
(Continued)

(58) Field of Classification Search
CPC ...... B60W 60/00; B60W 50/14; G06V 20/52; G08G 1/16
See application file for complete search history.

(56) References Cited

U.S. PATENT DOCUMENTS

2019/0337506 A1* 11/2019 Shima ...................... G08G 1/00
2020/0398829 A1* 12/2020 Kasai ..................... B60K 35/29
(Continued)

FOREIGN PATENT DOCUMENTS

JP 2007-161119 6/2007
JP 2018-012450 1/2018
(Continued)

OTHER PUBLICATIONS

Decision to Grant for Japanese Application No. 2021-135836, dated Jan. 21, 2025, with English translation.
(Continued)

*Primary Examiner* — Tan Q Nguyen
(74) *Attorney, Agent, or Firm* — GREENBLUM & BERNSTEIN, P.L.C.

(57) ABSTRACT

An information processing device according to the present disclosure includes a communication unit and a processor. The communication unit receives, from an in-vehicle device, vehicle identification information by which a vehicle is identifiable. The processor is configured to: detect an obstacle; and determine whether the vehicle is drivable along a driving route, according to a position of the detected obstacle and the driving route. Furthermore, the communication unit transmits a result of determination of drivability to the in-vehicle device.

21 Claims, 9 Drawing Sheets

(51) Int. Cl.
*G06V 20/52* (2022.01)
*G08G 1/16* (2006.01)
(52) U.S. Cl.
CPC ....... *G08G 1/168* (2013.01); *B60W 2050/146* (2013.01); *B60W 2420/403* (2013.01)

(56) References Cited

U.S. PATENT DOCUMENTS

| | | | |
|---|---|---|---|
| 2021/0107458 A1 | 4/2021 | Hiei | |
| 2021/0370918 A1* | 12/2021 | Hidaka | B60W 30/06 |

FOREIGN PATENT DOCUMENTS

| | | |
|---|---|---|
| JP | 2018-086928 | 6/2018 |
| JP | 2020-049983 | 4/2020 |
| JP | 2020-093582 | 6/2020 |
| JP | 2021-062717 | 4/2021 |
| WO | 2010-147020 | 12/2010 |

OTHER PUBLICATIONS

International Search Report (ISR) issued in International Pat. Appl. No. PCT/JP2022/019909, dated Aug. 2, 2022, along with an English translation thereof.

* cited by examiner

| VEHICLE ID | DRIVING AREA |
|---|---|
| 001 | ... |
| 002 | ... |
| 003 | ... |
| 004 | ... |

212

| VEHICLE ID | DRIVING ROUTE ID | PRIORITY | DRIVING AREA |
|---|---|---|---|
| 001 | R001 | 1 | ... |
| 001 | R002 | 2 | ... |
| 002 | R001 | 1 | ... |
| 003 | R001 | 1 | ... |
| 003 | R002 | 2 | ... |
| 003 | R003 | 3 | ... |
| 001 | R001 | 1 | ... |

FIG.11

| DRIVING ROUTE ID | PRIORITY | STEERING INFORMATION | BRAKING INFORMATION |
|---|---|---|---|
| R001 | 1 | ... | ... |
| R002 | 2 | ... | ... |
| R003 | 3 | ... | ... |

| DRIVING ROUTE ID | PRIORITY | SURROUNDING IMAGE |
|---|---|---|
| R001 | 1 | ... |
| R002 | 2 | ... |
| R003 | 3 | ... |

112

INFORMATION PROCESSING DEVICE, PARKING ASSISTANCE DEVICE, AND METHOD

CROSS-REFERENCE TO RELATED APPLICATIONS

This application is a continuation of International Application No. PCT/JP2022/019909, filed on May 11, 2022 which claims the benefit of priority of the prior Japanese Patent Application No. 2021-135836, filed on Aug. 23, 2021, the entire contents of which are incorporated herein by reference.

FIELD

Embodiments described herein relate generally to an information processing device, a parking assistance device, and a method.

BACKGROUND

Conventional parking assistance techniques are known to move vehicles by automatic driving when parking the vehicles. One of these parking assistance techniques performs parking assistance by using a driving route recorded on the basis of teacher driving by a driver. This technique is used for repetitive parking to a determined parking position, such as, a parking place of a user's home or a parking lot of a place of work (e.g., JP 2007-161119 A).

The present disclosure provides an information processing device configured to be able to determine drivability of a registered driving route before a vehicle starts moving based on the driving route.

SUMMARY

An information processing device according to the present disclosure includes a communication unit and a processor. The communication unit is configured to receive, from an in-vehicle device mounted in a vehicle performing an automatic driving in a parking lot along a driving route recorded based on teacher driving by a driver, vehicle identification information by which the vehicle is identifiable. The processor is configured to: detect an obstacle; and determine whether the vehicle is drivable along the driving route, according to a position of the detected obstacle and the driving route. The communication unit is configured to transmit a result of determination of drivability to the in-vehicle device.

BRIEF DESCRIPTION OF THE DRAWINGS

FIG. 11 is a table illustrating an example of steering/braking information according to the second embodiment;

FIG. 12 is a table illustrating an example of association between a surrounding image, a driving route ID, and a priority order according to the second embodiment;

DETAILED DESCRIPTION

Hereinafter, embodiments of an information processing device, a parking assistance device, and a method according to the present disclosure will be described with reference to the accompanying drawings.

First Embodiment

Figure 1:
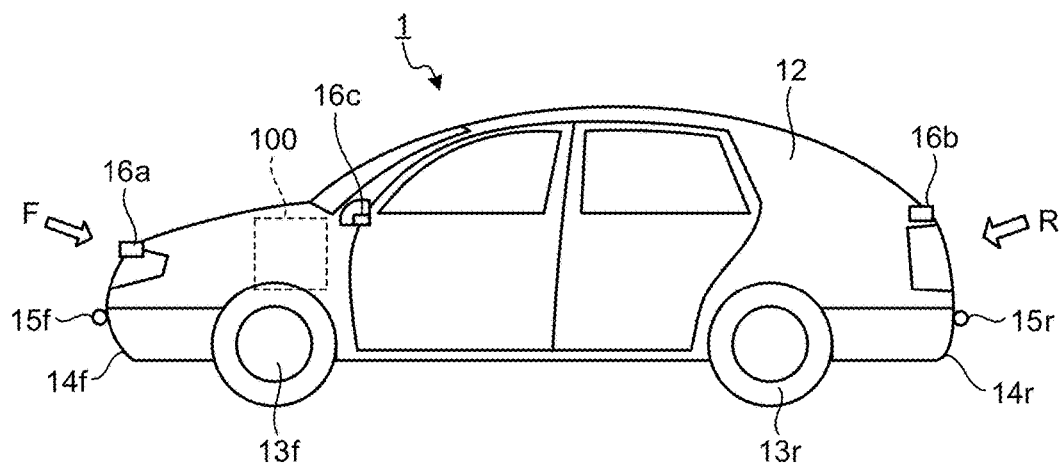
FIG. 1 is a diagram illustrating an example of a vehicle including a parking assistance device according to a first embodiment.

FIG. 1 is a diagram illustrating an example of a vehicle 1 including a parking assistance device 100 according to a first embodiment. As illustrated in FIG. 1, the vehicle 1 includes a vehicle body 12 and two pairs of wheels 13 arranged along the vehicle body 12 in a predetermined direction. The two pairs of wheels 13 include a pair of front tires 13f and a pair of rear tires 13r.

FIG. 1 illustrates one of the front tires 13f that is an example of a first wheel in the present embodiment. Furthermore, one of the rear tires 13r is illustrated as an example of a second wheel in the present embodiment. Note that although the vehicle 1 illustrated in FIG. 1 includes four wheels 13, the number of wheels 13 is not limited thereto. For example, the vehicle 1 may be a two-wheeled vehicle.

The vehicle body 12 is connected to the wheels 13 and is movable by the wheels 13. In this configuration, the predetermined direction in which the two pairs of wheels 13 are arranged is a driving direction of the vehicle 1. The vehicle 1 is configured to move forward or backward by shifting gears (not illustrated) or the like. Furthermore, the vehicle 1 is also configured to turn right and left by steering.

Furthermore, the vehicle body 12 has a front end portion F that is an end portion near the front tire 13f and a rear end portion R that is an end portion near the rear tire 13r. The vehicle body 12 has a substantially rectangular shape in top view, and the four corners of the substantially rectangular shape may be referred to as end portions. Furthermore, although not illustrated in FIG. 1, the vehicle 1 includes a display device, a speaker, and an operation unit.

A pair of bumpers 14 are provided at the front and rear end portions F and R of the vehicle body 12 near a lower end of the vehicle body 12. The pair of bumpers 14 has a front bumper 14f that covers the entire front surface and partial side surfaces, near the lower end portion of the vehicle body 12. The pair of bumpers 14 has a rear bumper 14r that covers the entire rear surface and partial side surfaces, near the lower end portion of the vehicle body 12.

Wave transmitter/receiver units 15f and 15r that transmit and receive a sound wave such as an ultrasonic wave are arranged at predetermined ends of the vehicle body 12. For example, one or more wave transmitter/receiver units 15f are arranged on the front bumper 14f, and one or more wave transmitter/receiver units 15r are arranged on the rear bumper 14r. Hereinafter, the wave transmitter/receiver units 15f and 15r are simply referred to as wave transmitter/receiver units 15 when not particularly limited. In addition, the number and positions of the wave transmitter/receiver units 15 are not limited to the example illustrated in FIG. 1. For example, the vehicle 1 may include the wave transmitter/receiver units 15 on the left and right sides.

In the present embodiment, a sonar using an ultrasonic wave will be described as an example of each of the wave transmitter/receiver units 15, but the wave transmitter/receiver unit 15 may be a radar that transmits and receives an electromagnetic wave. Alternatively, the vehicle 1 may include both of the sonar and the radar. Furthermore, the wave transmitter/receiver unit 15 may be simply referred to as sensor.

The wave transmitter/receiver units 15 each detects an obstacle around the vehicle 1 on the basis of a result of transmission/reception of the sound wave or the electromagnetic wave. Furthermore, the wave transmitter/receiver unit 15 measures a distance between the obstacle around the vehicle 1 and the vehicle 1 on the basis of the result of the transmission/reception of the sound wave or the electromagnetic wave.

In addition, the vehicle 1 includes a first in-vehicle camera 16a that captures an image of an area in front of the vehicle 1, a second in-vehicle camera 16b that captures an image of an area in back of the vehicle 1, a third in-vehicle camera 16c that captures an image of an area along a left side of the vehicle 1, and a fourth in-vehicle camera that captures an image of an area along a right side of the vehicle 1. Illustration of the fourth in-vehicle camera is omitted.

Hereinafter, the first in-vehicle camera 16a, the second in-vehicle camera 16b, the third in-vehicle camera 16c, and the fourth in-vehicle camera are simply referred to as in-vehicle cameras 16 unless otherwise particularly distinguished. The positions and the number of the in-vehicle cameras are not limited to the example illustrated in FIG. 1. For example, the vehicle 1 may also include only two of the first in-vehicle camera 16a and the second in-vehicle camera 16b. Alternatively, the vehicle 1 may further include another in-vehicle camera in addition to the example described above.

The in-vehicle cameras 16 are configured to capture video images around the vehicle 1, and are each, for example, a camera that captures a color image. Note that an image captured by each of the in-vehicle cameras 16 may be a moving image or a still image. Furthermore, each of the in-vehicle cameras 16 may be a camera built in the vehicle 1, a dashboard camera mounted later to the vehicle 1, or the like.

In addition, the parking assistance device 100 is mounted in the vehicle 1. The parking assistance device 100 is an information processing device that is configured to be mounted in the vehicle 1, and is, for example, an electronic control unit (ECU) or on board unit (OBU) provided inside the vehicle 1. Alternatively, the parking assistance device 100 may be an external device installed near a dashboard of the vehicle 1. Note that the parking assistance device 100 may also serve as a car navigation device or the like. The parking assistance device 100 is an example of an in-vehicle device in the present embodiment.

Figure 2:
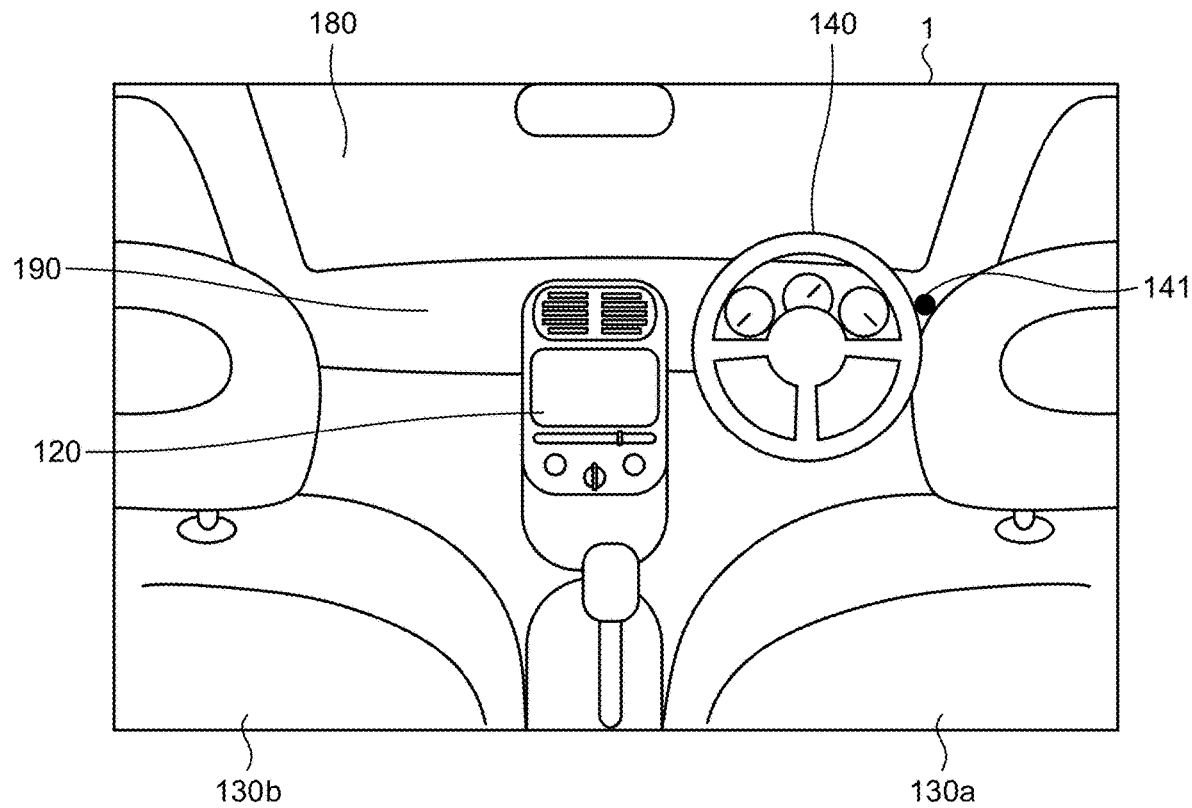
FIG. 2 is a diagram illustrating an exemplary configuration in the vicinity of a driver seat of the vehicle according to the first embodiment.

Next, a configuration in the vicinity of a driver seat of the vehicle 1 of the present embodiment will be described. FIG. 2 is a diagram illustrating an exemplary configuration in the vicinity of a driver seat 130a of the vehicle 1 according to the first embodiment.

As illustrated in FIG. 2, the vehicle 1 includes the driver seat 130a and a front seat 130b. Furthermore, a windshield 180, a dashboard 190, a steering wheel 140, a display device 120, and an operation button 141 are provided on the front side from the driver seat 130a.

The display device 120 is a display provided at the dashboard 190 of the vehicle 1. In an example, the display device 120 is positioned at the center of the dashboard 190 as illustrated in FIG. 2. The display device 120 is, for example, a liquid crystal display or an organic electro luminescence (EL) display. Furthermore, the display device 120 may also serve as a touch screen. The display device 120 is an example of a display unit in the present embodiment.

Furthermore, the steering wheel 140 is provided in front of the driver seat 130a so as to be operable by a driver. The rotation angle, that is, the steering angle of the steering wheel 140 is electrically or mechanically linked to a change in the direction of the front tires 13f that are steering wheels. Note that the steering wheels may be the rear tires 13r, or both the front tires 13f and the rear tires 13r may be the steering wheels.

The operation button 141 is a button configured to receive an operation by the user. Note that in the present embodiment, the user is, for example, the driver of the vehicle 1. The operation button 141 receives pressing by the driver to receive, for example, an operation to start parking assistance from the driver. Note that the operation button 141 is not limited in position to the example illustrated in FIG. 2 and may be provided, for example, at the steering wheel 140. The operation button 141 is an example of the operation unit in the present embodiment. Furthermore, in a case where the display device 120 also serves as the touch screen, the display device 120 may be an example of the operation unit. In addition, an operation terminal configured to transmit a signal from outside the vehicle 1 to the vehicle 1, such as a tablet terminal, smartphone, remote controller, or electronic key, which is not illustrated, may be an example of the operation unit.

The parking assistance device 100 of the present embodiment records the driving route on the basis of teacher driving by the driver, and provides parking assistance by using the recorded driving route. In other words, a parking assistance method performed by the parking assistance device 100 is a method for automatic driving of the vehicle 1 on the basis of the teacher driving by the driver. Such a parking assistance method is effective for saving the driver the trouble of parking, when the driver repeatedly parks in a fixed place, such as a home garage, a contracted parking slot of an apartment building, or a prescribed parking slot in a parking lot of a place of work or the like. Such parking assistance is called home zone parking.

In the present embodiment, in particular, it is assumed that there is a parking slot for the vehicle 1 in a parking lot of the apartment building or a parking lot of the place of work or the like. The parking assistance device 100 of the present embodiment is communicable with a server device that manages such a parking lot.

Figure 3:
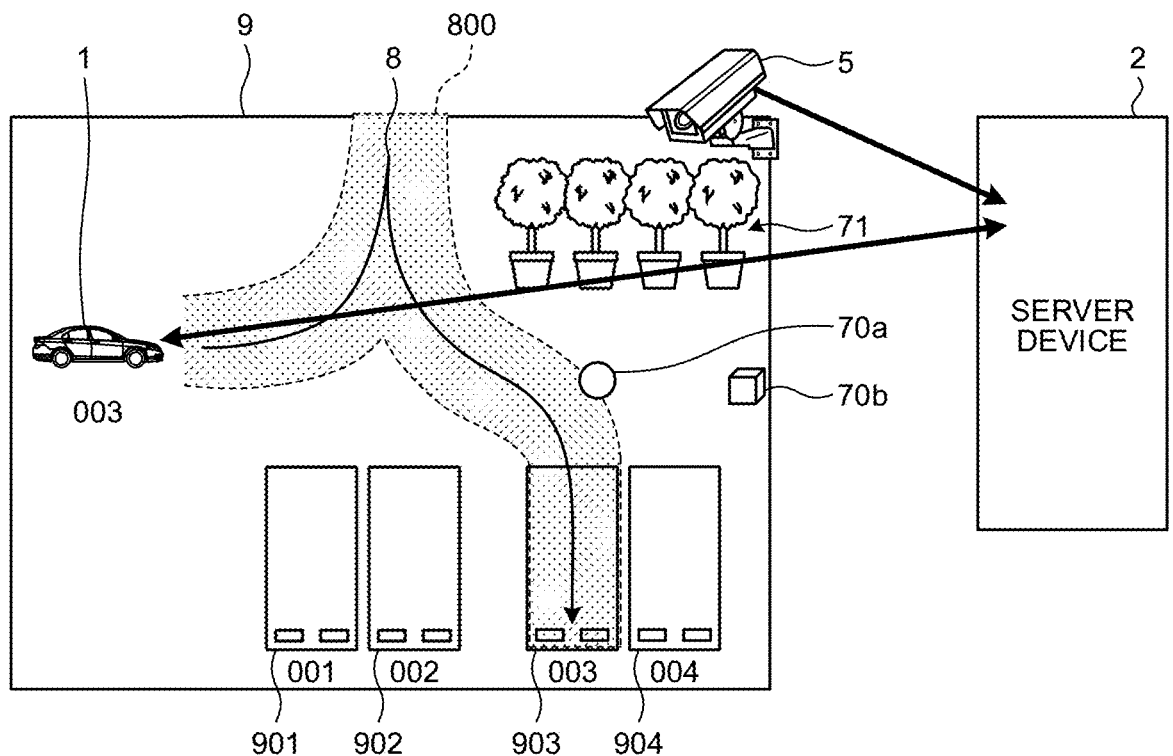
FIG. 3 is a diagram illustrating an example of a parking lot for parking the vehicle according to the first embodiment.

FIG. 3 is a diagram illustrating an example of a parking lot 9 for parking the vehicle 1 according to the first embodiment. As illustrated in FIG. 3, the parking lot 9 includes a plurality of parking slots 901 to 904. In the example illustrated in FIG. 3, the parking slot 903 is allocated to the vehicle 1.

A driving route 8 illustrated in FIG. 3 is a route of parking of the vehicle 1 in the parking slot 903 in the teacher driving through manual driving by the driver. A driving area 800 illustrated in FIG. 3 is an area through which the vehicle body 12 of the vehicle 1 passes when the vehicle 1 drives along the driving route 8.

The parking lot 9 is provided with a fixed camera 5. The fixed camera 5 is installed at a position where an image of at least the plurality of parking slots 901 to 904 and the driving areas 800 of a plurality of vehicles to which the parking slots 901 to 904 are allocated can be captured. The image captured by the fixed camera 5 may be a moving image or a still image. Furthermore, the fixed camera 5 may also serve as a monitoring camera or the like.

A server device 2 is provided, for example, in a control room or the like of the parking lot 9. Alternatively, the server device 2 may be provided outside the parking lot 9. The server device 2 is an example of the information processing device in the present embodiment.

The parking assistance device 100 of the vehicle 1 and the server device 2 communicate with each other by wireless communication. The wireless communication standard is Wi-Fi, Bluetooth (registered trademark), or the like, but is not particularly limited thereto.

Furthermore, the server device 2 acquires the image captured by the fixed camera 5, from the fixed camera 5. The server device 2 and the fixed camera 5 may communicate with each other by wireless communication, or may communicate with each other via a communication cable.

In addition, the parking assistance device 100 and the fixed camera 5 may not be directly connected to the server device 2 and, for example, may communicate with the server device 2 via a communication device provided in the parking lot 9.

The server device 2 stores an image acquired from the fixed camera 5, before the teacher driving of the vehicle 1. Thereafter, upon automatic parking of the vehicle 1 in the parking slot 903 by automatic driving based on the teacher driving, an image acquired from the fixed camera 5 before the teacher driving of the vehicle 1 is stored.

The image captured by the fixed camera 5 before the teacher driving of the vehicle 1 is an example of a first background image in the present embodiment. The image captured by the fixed camera 5 before starting the automatic driving is an example of a second background image in the present embodiment.

The server device 2 detects obstacles 70*a* and 70*b* on the basis of the first background image and the second background image. Details of a method of detecting the obstacles 70*a* and 70*b* will be described later. When the detected obstacles 70*a* and 70*b* are positioned in the driving area 800, the server device 2 determines undrivability indicating that the vehicle 1 is not drivable along the driving route 8. The server device 2 transmits a result of the determination of drivability, to the vehicle 1.

Next, functions of the parking assistance device 100 and the server device 2 of the embodiment will be described in detail.

Figure 4:
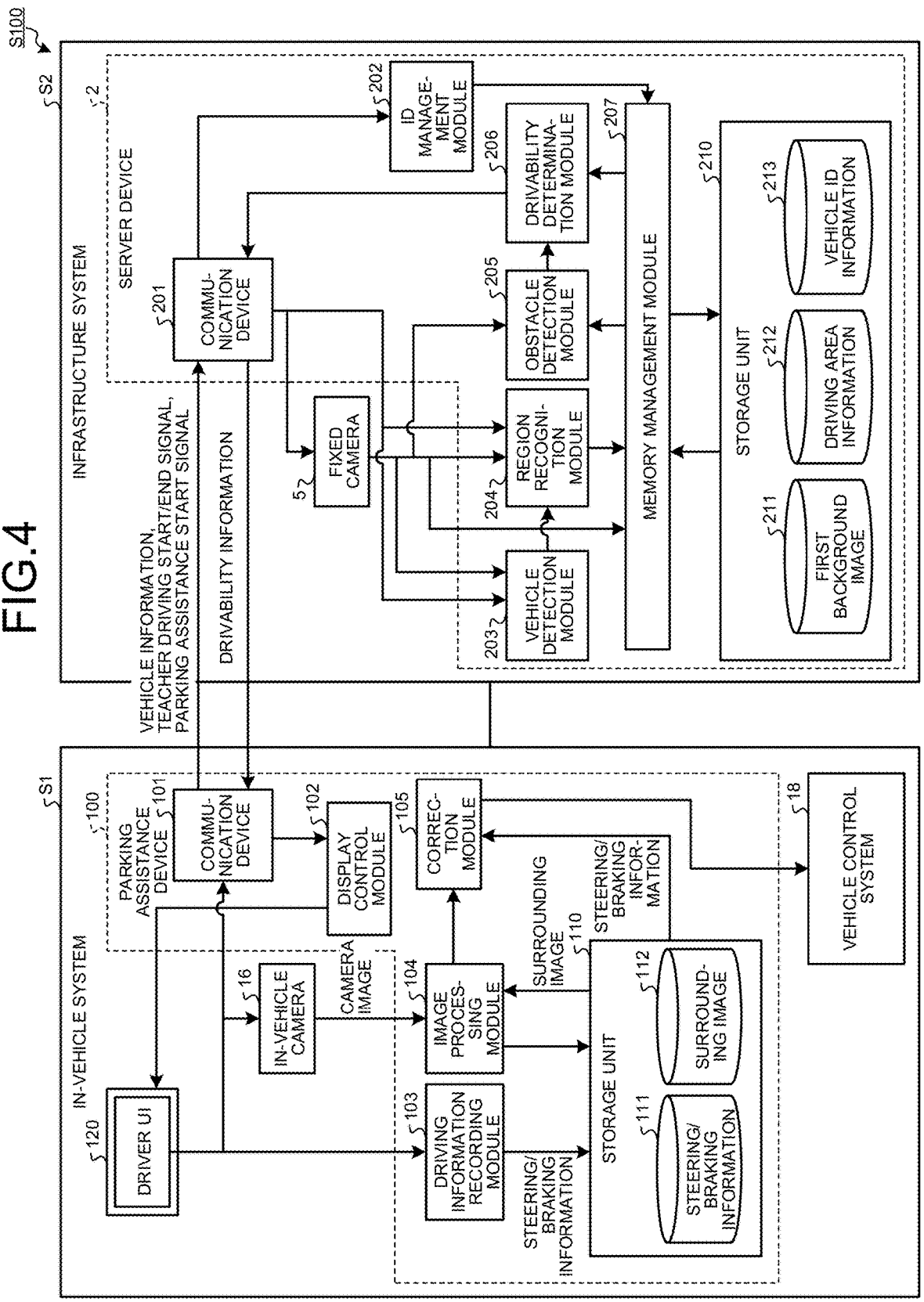
FIG. 4 is a diagram illustrating an example of a parking assistance system according to the first embodiment.

FIG. 4 is a diagram illustrating an example of a parking assistance system S100 according to the first embodiment. The parking assistance system S100 of the present embodiment includes an in-vehicle system S1 mounted in the vehicle 1 and an infrastructure system S2 provided for the parking lot.

The in-vehicle system S1 includes the display device 120, the in-vehicle cameras 16, the parking assistance device 100, and a vehicle control system 18. Note that the in-vehicle system S1 may further include another device.

The vehicle control system 18 controls steering, an accelerator, a brake, and transmission gears of the vehicle 1 to control the driving of the vehicle 1.

The parking assistance device 100 includes a communication device 101, a display control module 102, a driving information recording module 103, an image processing module 104, a correction module 105, and a storage unit 110.

Note that in FIG. 4, the parking assistance device 100 is illustrated as a single device including the communication device 101, the display control module 102, the driving information recording module 103, the image processing module 104, the correction module 105, and the storage unit 110, but the configuration of the parking assistance device 100 is not limited to this configuration. For example, the parking assistance device 100 may include a plurality of devices such as ECUs. In addition, the vehicle control system 18 and the parking assistance device 100 may be integrated into one ECU.

The storage unit 110 includes, for example, a read only memory (ROM), a random access memory (RAM), a flash memory, a hard disk drive (HDD), or the like. Note that a plurality of storage media may function as the storage unit 110.

The storage unit 110 stores programs and data used for various processing performed in the parking assistance device 100. For example, each of the programs executed in the parking assistance device 100 of the present embodiment has a module configuration including the above-described functional units (display control module 102, driving information recording module 103, image processing module 104, and correction module 105), and in actual hardware, the CPU reads the program from the storage unit 110 to execute, whereby the above-described units are loaded to the RAM, and the display control module 102, the driving information recording module 103, the image processing module 104, and the correction module 105 are generated on the RAM. Note that processing implemented by each functional unit of the parking assistance device 100 is also referred to as step.

The program executed in the parking assistance device 100 of the present embodiment is provided by being recorded in the form of installable or executable file, on a computer-readable recording medium, such as a flash memory.

In addition, the program executed in the parking assistance device 100 of the present embodiment may be configured to be stored on a computer connected to a network such as the Internet and provided by being downloaded via the network. In addition, the program executed in the parking assistance device 100 of the present embodiment may be configured to be provided or distributed via a network such as the Internet. In addition, the program executed in the parking assistance device 100 of the present embodiment may be configured to be provided by being incorporated in the ROM or the like in advance.

Note that the display control module 102, the driving information recording module 103, the image processing module 104, and the correction module 105 may be individual hardware circuits.

The communication device 101 is a communication device that is configured to wirelessly communicate with an information processing device outside the vehicle 1. Specifically, it is assumed that the communication device 101 is wirelessly communicable with the server device 2 of the infrastructure system S2. Note that, as described with reference to FIG. 3, the communication device 101 may not be directly connected to the server device 2, and may communicate with, for example, the server device 2 via another communication device provided in the parking lot 9. The communication device 101 is an example of a communication unit of the parking assistance device 100 in the present embodiment.

In the present embodiment, when the vehicle 1 enters a communication range of the server device 2, the communication device 101 transmits vehicle information about the vehicle 1 to the server device 2. Furthermore, the communication device 101 receives, from the server device 2, information indicating drivability of the driving route 8.

The vehicle information is information about the vehicle 1, and includes at least a vehicle ID by which the vehicle 1 is identifiable. The vehicle ID is an example of vehicle identification information in the present embodiment.

Furthermore, when a user's operation for starting the teacher driving is input from a driver UI or another operation unit, the communication device 101 transmits a teacher driving start signal indicating the start of the teacher driving, to the server device 2. In addition, when a user's operation for finishing the teacher driving is input from the driver UI or the other operation unit, the communication device 101 transmits a teacher driving end signal indicating the finish of the teacher driving, to the server device 2. Furthermore, when a user's operation for starting parking assistance by automatic driving is input from the driver UI or the other operation unit, the communication device 101 transmits a parking assistance start signal indicating the start of parking assistance, to the server device 2.

The display control module 102 controls the display device 120 to display various driver user interfaces (UIs). For example, when the drivability information received by the communication device 101 from the server device 2 indicates that the vehicle 1 cannot drive along the driving route 8, the display control module 102 causes the display device 120 to output a notification.

For example, the display control module 102 controls the display device 120 in the vehicle 1 to display, as the notification, for example, a message indicating that automatic driving cannot be started due to the presence of the obstacle 70a. The display control module 102 is an example of an output unit in the present embodiment.

Note that a method of outputting the notification is not limited to screen display, and may output the notification by voice, or the like. For example, the parking assistance device 100 may include a voice output unit that causes the speaker to output a voice message.

The driving information recording module 103 records driving information about the vehicle 1 in the teacher driving. The driving information recording module 103 acquires steering information about a steering angle of the vehicle 1 and braking information about a braking operation, from various sensors or another ECUs of the vehicle 1, and registers the acquired information in the storage unit 110. In FIG. 4, the steering information and the braking information are collectively referred to as steering/braking information 111.

The image processing module 104 acquires surrounding images 112 obtained by capturing the surroundings of the vehicle 1, from the in-vehicle cameras 16 during the teacher driving, and registers the surrounding images in the storage unit 110.

The steering/braking information 111 and the surrounding images 112 are collectively referred to as registered data for automatic parking.

In addition, during parking assistance by automatic driving, the image processing module 104 compares the surrounding images acquired from the in-vehicle cameras 16 with the surrounding images 112 during the teacher driving registered in the storage unit 110, and estimates the position of the vehicle 1 on the basis of a result of the comparison. For example, the image processing module 104 extracts feature points from the surrounding images acquired during the parking assistance and the surrounding images 112 during the teacher driving, and estimates a current relative position of the vehicle 1 relative to the position of the vehicle 1 during the teacher driving, on the basis of a difference in position between the feature points.

As a method of extracting the feature points, a method such as features from accelerated segment test (FAST) or oriented FAST and rotated BRIEF (ORB) may be adopted. Furthermore, the image processing module 104 may perform localization by another known method. The image processing module 104 may define an environment around the vehicle 1 as a map, on the basis of the feature points extracted from the surrounding images 112 captured during the teacher driving, and cause the storage unit 110 to store the map.

The correction module 105 corrects the steering/braking information 111 registered in the storage unit 110, on the basis of the relative position of the vehicle 1 estimated by the image processing module 104 upon the parking assistance by automatic driving.

Furthermore, when an obstacle around the vehicle 1 is detected by a wave transmitter/receiver unit 15, the correction module 105 may correct the steering/braking information 111 according to the position of the obstacle. In addition, the detection of the obstacle around the vehicle 1 is not limited to detection by the wave transmitter/receiver unit 15, and the detection of the obstacle around the vehicle 1 is may be performed on the basis of an image captured by each of the in-vehicle cameras 16. For example, the in-vehicle camera 16 may detect the obstacle from the captured image by image recognition or the like. Alternatively, the correction module 105 may detect the obstacle from the image captured by the in-vehicle camera 16 by using image recognition or the like. The detection of the obstacle by the wave transmitter/receiver unit 15 and the detection of the obstacle based on the image, by the in-vehicle camera 16 or the correction module 105 may be used in combination, or either thereof may be used.

Furthermore, the correction module 105 may correct the steering/braking information 111 on the basis of not only the result of the detection of the obstacle but also various surrounding information indicating the situation around the vehicle 1.

The correction module 105 transmits the corrected steering/braking information 111 to the vehicle control system 18. The vehicle control system 18 controls the vehicle 1 to autonomously drive on the basis of the steering/braking information 111 corrected by the correction module 105.

The infrastructure system S2 includes the fixed camera 5 and the server device 2.

The server device 2 includes a communication device 201, an ID management module 202, a vehicle detection module 203, a region recognition module 204, an region recognition module 205, a drivability determination module 206, a memory management module 207, and a storage unit 210.

Note that in FIG. 4, the server device 2 is illustrated as a single device including the communication device 201, the ID management module 202, the vehicle detection module 203, the region recognition module 204, the region recognition module 205, the drivability determination module 206, the memory management module 207, and the storage unit 210, but the configuration of the server device 2 is not limited to this configuration. For example, some or all of the functions of the server device 2 may be provided in a cloud environment. Furthermore, these functions may be implemented by a plurality of the server devices 2.

The storage unit 210 includes, for example, ROM, RAM, a flash memory, HDD, or the like. Note that a plurality of storage media may function as the storage unit 210.

The storage unit 210 stores programs and data used for various processing performed in the server device 2. For example, each of the programs executed in the server device 2 of the present embodiment has a module configuration including the above-described functional units (ID management module 202, vehicle detection module 203, region recognition module 204, region recognition module 205, drivability determination module 206, and memory management module 207), and in actual hardware, the CPU reads the program from the storage unit 210 to execute, whereby the above-described units are loaded to the RAM, and the ID management module 202, the vehicle detection module 203, the region recognition module 204, the region recognition module 205, the drivability determination module 206, and the memory management module 207 are generated on the RAM. Note that processing implemented by each functional unit of the server device 2 is also referred to as step.

The program executed in the server device 2 of the present embodiment is provided by being recorded in the form of installable or executable file, on a computer-readable recording medium, such as a flash memory.

In addition, the program executed by the server device 2 of the present embodiment may be configured to be stored on a computer connected to a network such as the Internet and provided by being downloaded via the network. In addition, the program run in the server device 2 of the present embodiment may be configured to be provided or distributed via a network such as the Internet. In addition, the program run in the server device 2 of the present embodiment may be configured to be provided by being incorporated in the ROM or the like in advance.

Note that the ID management module 202, the vehicle detection module 203, the region recognition module 204, the region recognition module 205, the drivability determination module 206, and the memory management module 207 may be individual hardware circuits.

The communication device 201 is a communication device that is configured to wirelessly communicate with the parking assistance device 100 and the fixed camera 5. The communication device 201 is an example of a communication unit of the server device 2 in the present embodiment.

In the present embodiment, the communication device 201 receives the vehicle information from the parking assistance device 100. For example, when the vehicle 1 enters the communication range of the communication device 201 and the communication device 101 of the parking assistance device 100 and the communication device 201 of the server device 2 communicate with each other, the communication device 201 receives the vehicle information transmitted from the communication device 101.

In addition, the communication device 201 acquires the teacher driving start signal, the teacher driving end signal, and the parking assistance start signal from the parking assistance device 100.

Furthermore, the communication device 201 transmits the drivability information indicating a result of the determination of whether the vehicle 1 is drivable along the driving route 8, to the parking assistance device 100.

Furthermore, the communication device 201 acquires an image captured by the fixed camera 5, from the fixed camera 5. The communication device 201 may continuously acquire images captured by the fixed camera 5 all the time. Note that, the image captured by the fixed camera 5 is used in processing performed by the vehicle detection module 203, the region recognition module 204, the region recognition module 205, and the memory management module 207, and therefore, the fixed camera 5 and the vehicle detection module 203, the region recognition module 204, the region recognition module 205, and the memory management module 207 are connected by arrows in FIG. 4, but an actual transmission path of the image may be performed via the communication device 201.

The ID management module 202 extracts the vehicle ID of the vehicle 1 included in the vehicle information received by the communication device 201. The ID management module 202 transmits the vehicle ID of the vehicle 1 to the memory management module 207. In addition, the ID management module 202 may determine whether the vehicle ID of the vehicle 1 included in the vehicle information is included in vehicle ID information 213 registered in advance in the storage unit 210. The vehicle ID information 213 is, for example, a table in which the vehicle ID of the vehicle 1 for which the parking lot 9 is contracted is associated with a contracted parking slot ID by which the contracted parking slot of the vehicle 1 can be identified.

The vehicle detection module 203 detects the vehicle 1 from a plurality of images captured in time series by the fixed camera 5 during the teacher driving of the vehicle 1. A method for detecting the vehicle 1 is not particularly limited, but for example, a known image processing technology such as object recognition can be adopted. In addition, the vehicle detection module 203 may extract a difference between the first background image captured before starting the teacher driving of the vehicle 1 and an image captured during the teacher driving of the vehicle 1 to detect the vehicle 1. The vehicle detection module 203 transmits the plurality of images and positions where the vehicle 1 is depicted on the images, to the region recognition module 204.

The region recognition module 204 recognizes the driving area 800 of the vehicle 1 in the parking lot 9, on the basis of a change in position of the vehicle 1 during the teacher driving detected by the vehicle detection module 203. For example, the region recognition module 204 identifies a range of the driving area 800 in the image on the basis of coordinates on the image. The region recognition module 204 transmits the recognized driving area 800, to the memory management module 207. The memory management module 207 stores, in the storage unit 210, the driving area 800 recognized by the region recognition module 204 and the vehicle ID identified by the ID management module 202, in association with each other as driving area information 212. Note that the processing may be performed by the region recognition module 204.

In addition, the region recognition module 204 may recognize a moving route at the center in the width direction of the recognized driving area 800, as the driving route 8.

Figures 5, 6:
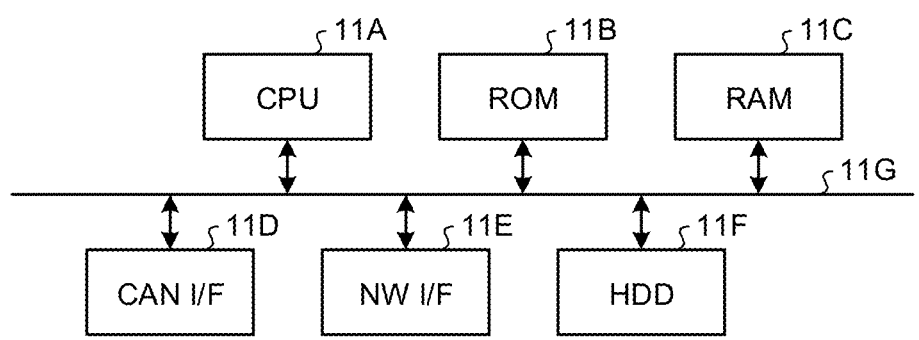
FIG. 5 is a table illustrating an example of driving area information according to the first embodiment.
FIG. 6 is a diagram illustrating an exemplary hardware configuration of the parking assistance device according to the first embodiment.

FIG. 5 is a table illustrating an example of the driving area information 212 according to the first embodiment. As illustrated in FIG. 5, the driving area information 212 is, for example, a table in which the vehicle ID of each vehicle and a driving area are associated with each other.

Returning to FIG. 4, the region recognition module 205 detects the obstacles 70a and 70b positioned in the parking lot 9, on the basis of the image captured by the fixed camera 5. More specifically, the obstacles 70a and 70b are detected on the basis of the second background image obtained by capturing the parking lot 9 upon starting the automatic driving of the vehicle 1 and the first background image obtained by capturing the parking lot 9 before starting the teacher driving of the vehicle 1. For example, the region recognition module 205 extracts a difference between the first background image and the second background image to detect the obstacles 70a and 70b.

In the example illustrated in FIG. 3, it is assumed that potted plants 71 have already been positioned in the parking lot 9 before automatic driving of the vehicle 1. In this situation, the potted plants 71 are depicted at the same positions in both the first background image and the second background image, and therefore, the background images have no difference. In this case, the region recognition module 205 does not detect the potted plants 71 as the obstacles.

In addition, the obstacles 70a and 70b are not positioned in the parking lot 9 upon the teacher driving of the vehicle 1, and are positioned in the parking lot 9 upon starting the automatic driving of the vehicle 1. Therefore, the obstacles 70a and 70b are not depicted in the first background image, but are depicted only in the second background image. In this case, the first background image and the second background image have a difference in the places of the obstacles 70a and 70b. In this configuration, the region recognition module 205 detects the obstacles 70a and 70b.

Note that the region recognition module 205 may detect the obstacles 70a and 70b by using another method. For example, the region recognition module 205 may detect the obstacles 70a and 70b from the image obtained by capturing the parking lot 9 upon starting the automatic driving of the vehicle 1 by using image recognition. The image used for image recognition is captured by the fixed camera 5, for example, at the same timing as that of capturing the second background image. When this method is adopted, the first background image during the teacher driving may not be stored in the storage unit 210. The region recognition module 205 is an example of a detection unit in the present embodiment.

The region recognition module 205 transmits the positions of the detected obstacles 70a and 70b to the drivability determination module 206. The positions of the obstacles 70a and 70b may be represented by coordinates, for example, on the second background image.

The drivability determination module 206 determines whether the vehicle 1 is drivable along the driving route 8, on the basis of the positions of the obstacles 70a and 70b detected by the region recognition module 205 and the driving route 8 of the vehicle 1. The drivability determination module 206 is an example of a determination unit in the present embodiment.

More specifically, when the positions of the detected obstacles 70a and 70b are located in the driving area 800 through which the vehicle 1 passes when the vehicle 1 drives along the driving route 8, the drivability determination module 206 determines that the vehicle 1 is not drivable along the driving route 8.

In the present embodiment, "the positions of the obstacles 70a and 70b are located within the driving area 800" means that at least part of any of the obstacles 70a and 70b is in the driving area 800. In the example illustrated in FIG. 3, the obstacle 70b is not positioned in the driving area 800, but part of the obstacle 70a is positioned in the driving area 800. In this situation, the drivability determination module 206 determines that the vehicle 1 is not drivable along the driving route 8. The drivability determination module 206 transmits the result of the determination of drivability, to the communication device 201.

The memory management module 207 manages storage of data in the storage unit 210 and reading of data from the storage unit 210. In addition, the memory management module 207 causes the storage unit 210 to record a first background image 211 obtained by capturing the parking lot 9 during the teacher driving of the vehicle 1 in association with the vehicle ID. The vehicle ID may be registered, for example, as additional information about the first background image 211, or the vehicle ID may be associated with the first background image 211 in the form such as a table. The memory management module 207 is an example of a recording unit in the present embodiment.

Note that in the present embodiment, the memory management module 207 performs processing of storing various data generated by other functional units in the storage unit 210, but the processing may be performed by another functional unit.

Next, a hardware configuration of the parking assistance device 100 will be described. FIG. 6 is a diagram illustrating an exemplary hardware configuration of the parking assistance device 100 according to the first embodiment.

Next, a hardware configuration of the parking assistance device 100 will be described. FIG. 6 is a diagram illustrating an exemplary hardware configuration of the parking assistance device 100 according to the first embodiment. As illustrated in FIG. 6, the parking assistance device 100 includes a hardware configuration in which a central processing unit (CPU) 11A, ROM 11B, RAM 11C, a controller area network (CAN) interface (I/F) 11D, a network (NW) I/F 11E, HDD 11F, and the like are connected to each other via a bus 11G, and uses a usual computer.

The CPU 11A is an arithmetic device that entirely controls the ECUs. Note that the CPU 11A is an example of a processor in the parking assistance device 100 of the present embodiment, and another processor or processing circuit may be provided instead of the CPU 11A.

The ROM 11B, the RAM 11C, and the HDD 11F function as the storage unit 110. For example, the ROM 11B stores programs and the like that implement various processing by the CPU 11A. The RAM 11C is, for example, a main storage device of the parking assistance device 100, and stores data necessary for various processing by the CPU 11A.

The CAN I/F 11D is an interface for transmitting and receiving information to and from another ECU mounted in the vehicle 1 via CAN in the vehicle 1. Note that a standard other than the CAN may be adopted. The NW I/F 11E is the communication device 101 configured to communicate with an information processing device outside the vehicle 1 via a network such as the Internet.

Note that the hardware configuration of the parking assistance device 100 illustrated in FIG. 6 is an example, and the parking assistance device 100 is not limited to this example.

Furthermore, although a hardware configuration of the server device 2 is not illustrated, the hardware configuration uses a normal computer including a processor and a storage device, as in the parking assistance device 100.

Next, a driving route recording process performed in the parking assistance device 100 and the server device 2 of the present embodiment configured as described above will be described.

Figure 7:
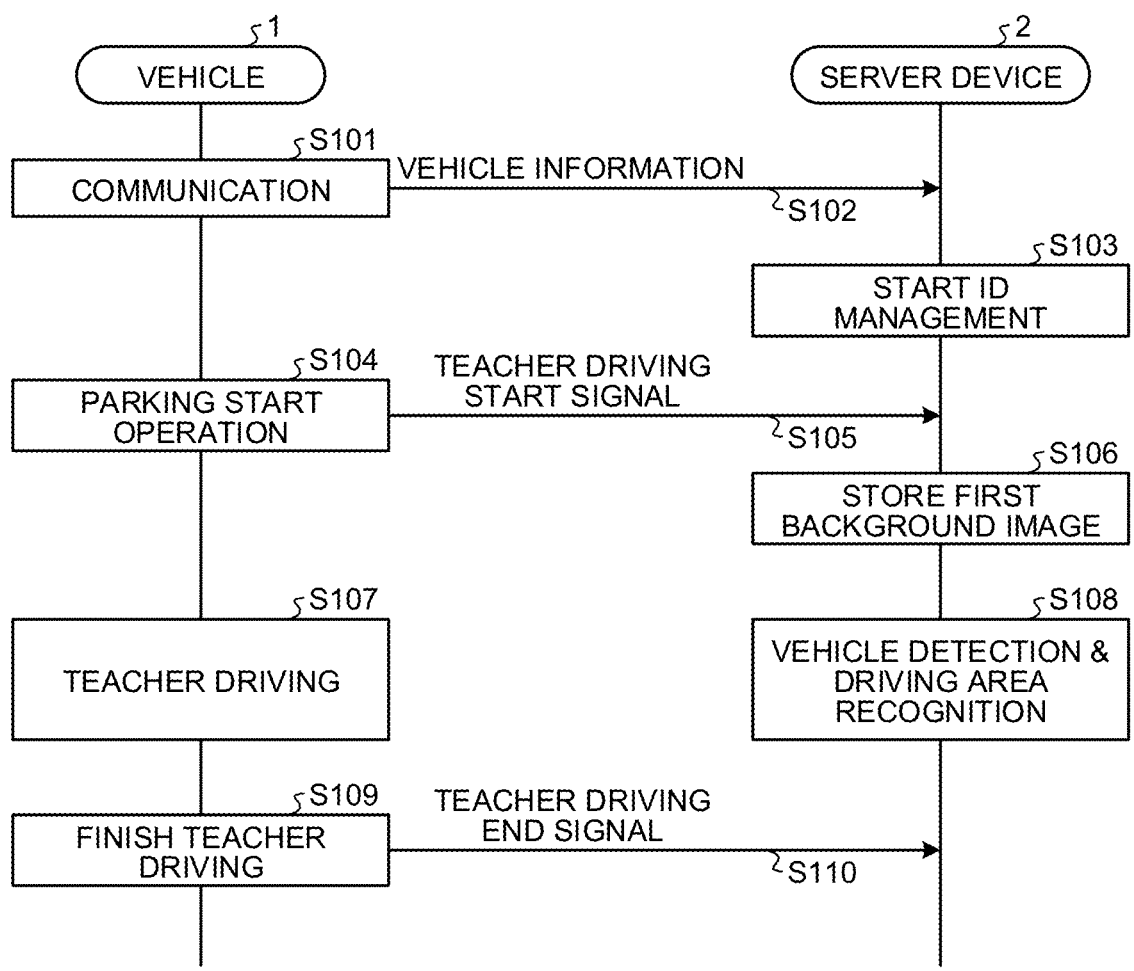
FIG. 7 is a sequence diagram illustrating an example of a driving route recording process performed by the parking assistance device and a server device according to the first embodiment.

FIG. 7 is a sequence diagram illustrating an example of the driving route recording process performed by the parking assistance device 100 and the server device 2 according to the first embodiment. This process is performed upon teacher driving of the vehicle 1 through manual driving by the driver. At the start of the process, it is assumed that the vehicle 1 has been at an entrance of the parking lot 9.

When the vehicle 1 arrives at the entrance of the parking lot 9, the vehicle 1 enters the communication range of the communication device 201 of the server device 2. Here, as illustrated in FIG. 7, the communication device 101 of the parking assistance device 100 and the communication device 201 of the server device 2 communicate with each other (S101).

In this case, the communication device 101 of the parking assistance device 100 transmits the vehicle information about the vehicle 1, to the server device 2 (S102). The communication device 201 of the server device 2 receives the vehicle information. Then, the ID management module 202 extracts the vehicle ID of the vehicle 1 included in the vehicle information received by the communication device 201, and transmits the vehicle ID to the memory management module 207. In the following processing, various data are stored in association with the vehicle ID extracted by the ID management module 202. Such management of various data in association with the vehicle ID is referred to as ID management (S103). Note that at this time, the ID management module 202 may perform authentication processing for the vehicle ID of the vehicle 1 on the basis of the vehicle ID information 213. For example, it may be configured that the driving area 800 in the parking lot 9 is registered only with a vehicle ID registered in advance.

Then, the driver UI or the other operation unit displayed on the display device 120 receives a parking start operation for teacher driving by the driver (S104).

Here, the communication device 101 of the parking assistance device 100 transmits the teacher driving start signal to the server device 2 (S105). The communication device 201 of the server device 2 receives the teacher driving start signal.

When the communication device 201 receives the teacher driving start signal, the memory management module 207 of the server device 2 stores, as the first background image 211, an image captured by the fixed camera 5 at this point in the storage unit 210, in association with the vehicle ID of the vehicle 1 (S106). At this point, the vehicle 1 has not entered the parking lot 9. Therefore, the vehicle 1 itself is not depicted in the first background image 211, and a state of the parking lot 9 where the vehicle 1 is to drive is depicted.

Then, the vehicle 1 starts teacher driving by the driver (S107). Note that the communication device 101 may further transmit a signal to the server device 2 at timing of actual start of the teacher driving of the vehicle 1, in addition to the timing of receiving the parking start operation in S104. During the teacher driving through manual operation by the driver, the driving information recording module 103 records the driving information about the vehicle 1 in the teacher driving. In addition, the image processing module 104 acquires surrounding images from the in-vehicle cameras 16.

Then, during the teacher driving of the vehicle 1, the vehicle detection module 203 of the server device 2 detects the vehicle 1, from the plurality of images captured in time series by the fixed camera 5. In addition, the region recognition module 204 recognizes the driving area 800 of the vehicle 1 in the parking lot 9, on the basis of a change in position of the vehicle 1 during the teacher driving detected by the vehicle detection module 203 (S108).

Then, the driver UI or the other operation unit displayed on the display device 120 receives an end operation for the teacher driving by the driver (S109).

Here, the communication device 101 of the parking assistance device 100 transmits the teacher driving end signal to the server device 2 (S110). The communication device 201 of the server device 2 receives the teacher driving end signal. When the communication device 201 receives the teacher driving end signal, the processing of detecting the vehicle 1 by the vehicle detection module 203 and the processing of recognizing the driving area 800 by the region recognition module 204 are finished. The region recognition module 204 stores the recognized driving area 800 in the storage unit 210 via the memory management module 207. Here, the process of this sequence diagram is finished.

Next, a parking assistance process performed by the parking assistance device 100 and the server device 2 of the present embodiment which are configured as described above will be described.

Figure 8:
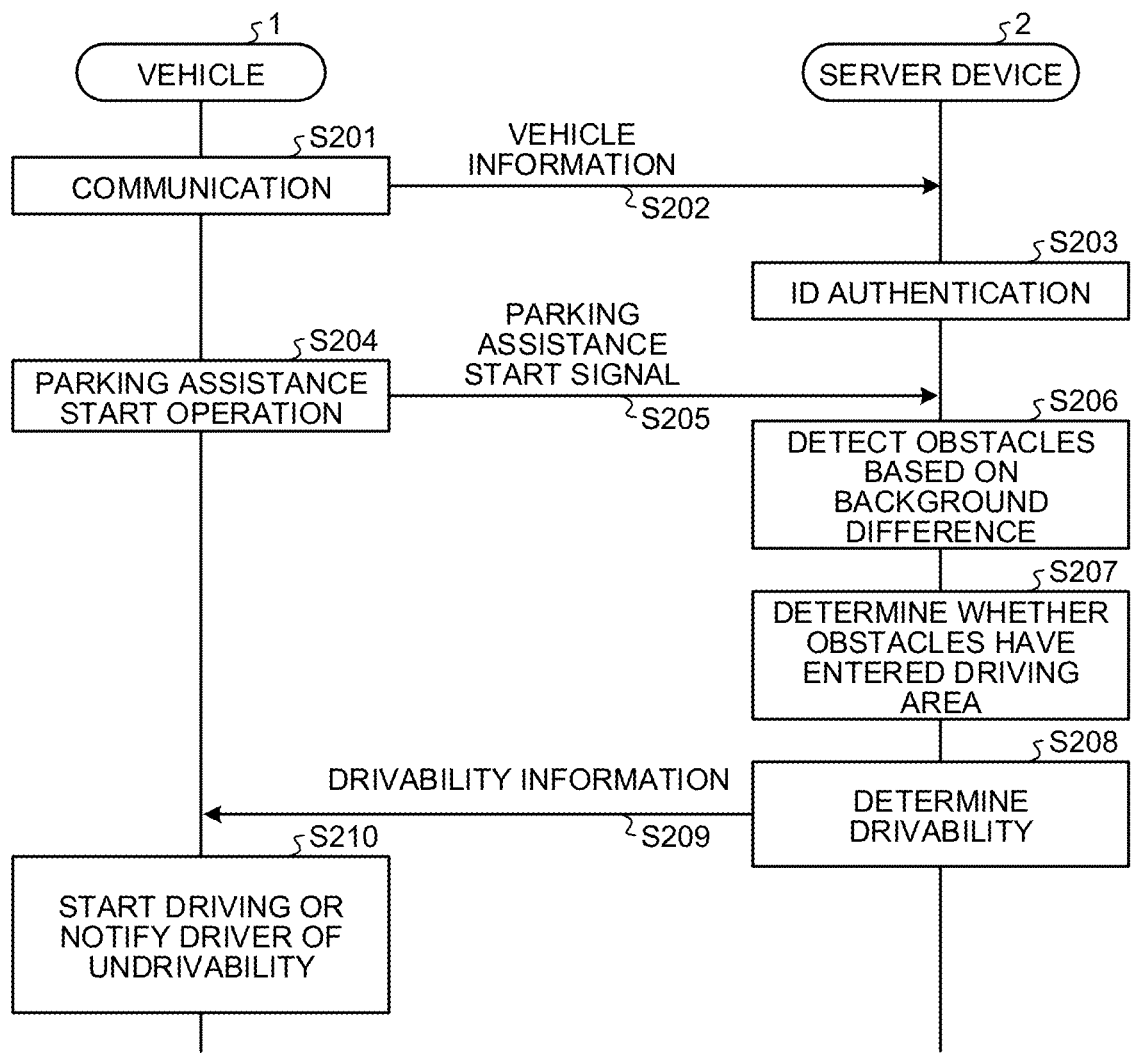
FIG. 8 is a sequence diagram illustrating an example of a parking assistance process performed by the parking assistance device and the server device according to the first embodiment.

FIG. 8 is a sequence diagram illustrating an example of the parking assistance process performed by the parking assistance device 100 and the server device 2 according to the first embodiment. In the process of this sequence diagram, it is assumed that the driving area 800 based on the teacher driving of the vehicle 1 has been registered in the server device 2.

When the vehicle 1 arrives at the entrance of the parking lot 9, the vehicle 1 enters the communication range of the communication device 201 of the server device 2. Here, as illustrated in FIG. 7, the communication device 101 of the parking assistance device 100 and the communication device 201 of the server device 2 communicate with each other (S101).

In this case, the communication device 101 of the parking assistance device 100 transmits the vehicle information about the vehicle 1, to the server device 2 (S201). The communication device 201 of the server device 2 receives the vehicle information (S202).

Then, the ID management module 202 extracts the vehicle ID of the vehicle 1 included in the vehicle information received by the communication device 201, and performs authentication processing (S203). For example, the ID management module 202 may determine whether the vehicle ID of the vehicle 1 is registered in the vehicle ID information 213 and the driving area information 212. When the vehicle ID of the vehicle 1 is not registered in the driving area information 212, the communication device 101 may transmit, to the vehicle 1, information indicating that the teacher driving can be performed but the parking assistance by automatic driving cannot be performed. Note that the processing is not essential.

Next, the driver UI or the other operation unit displayed on the display device 120 receives a parking assistance start operation for teacher driving by the driver (S204).

Here, the communication device 101 of the parking assistance device 100 transmits the parking assistance start signal to the server device 2 (S205). The communication device 201 of the server device 2 receives the parking assistance start signal.

When the communication device 201 receives the parking assistance start signal, the region recognition module 205 of the server device 2 acquires the second background image obtained by capturing the parking lot 9 at this time point by the fixed camera 5. The region recognition module 205 may store the second background image in the storage unit 210. Then the region recognition module 205 extracts a difference between the second background image and the first background image 211 that is stored in the storage unit 210 to detect the obstacles 70a and 70b (S206).

Then, the drivability determination module 206 determines whether the obstacles 70a and 70b have entered the driving area 800, according to the positions of the obstacles 70a and 70b detected by the region recognition module 205 and the driving route 8 of the vehicle 1 (S207).

Note that during performance of the processing of S206 and S207, the image processing module 104 of the parking assistance device 100 may start the self-position estimation processing based on the surrounding image acquired from each in-vehicle camera 16.

Next, the drivability determination module 206 determines whether the vehicle 1 is drivable along the driving route 8 (S208). For example, when at least part of any one of the obstacles 70a and 70b has entered the driving area 800, the drivability determination module 206 determines that the vehicle 1 is not drivable along the driving route 8.

Then, the communication device 201 transmits the drivability information to the parking assistance device 100 (S209). The communication device 101 of the parking assistance device 100 receives the drivability information.

When the drivability information indicates undrivability, the communication device 201 may transmit the second background image to the parking assistance device 100, together with the drivability information. Furthermore, here, when the obstacle 70a, of the obstacles 70a and 70b detected by the region recognition module 205, is determined to be positioned in the driving area 800 by the drivability determination module 206, the communication device 201 may transmit information indicating the position of the obstacle 70a on the second background image, to the parking assistance device 100.

On the basis of the drivability information, the parking assistance device 100 starts parking assistance by automatic driving or outputs a notification of undrivability to the driver (S210).

For example, when the drivability information indicates that the vehicle is drivable, the correction module 105 of the parking assistance device 100 transmits the steering/braking information 111 corrected according to the situation around the vehicle 1 to the vehicle control system 18, and starts the parking assistance by automatic driving. Here, the display control module 102 may control the display device 120 to display that the automatic driving is started.

Furthermore, when the drivability information indicates undrivability, the display control module 102 of the parking assistance device 100 controls the display device 120 to display the notification of undrivability to the driver.

Figures 9, 10:
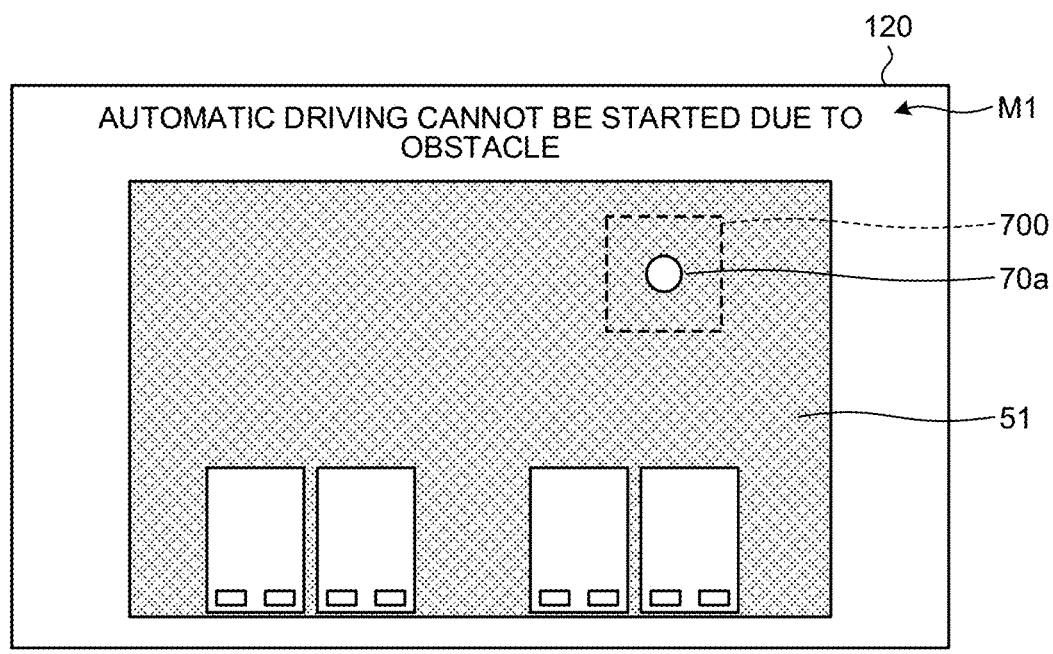
FIG. 9 is a diagram illustrating an example of a notification screen displaying undrivability according to the first embodiment.
FIG. 10 is a table illustrating an example of driving area information according to a second embodiment.

FIG. 9 is a diagram illustrating an example of a notification screen displaying undrivability according to the first embodiment. As illustrated in FIG. 9, the display control module 102 controls the display device 120 to display thereon a message M1 indicating that the automatic driving cannot be started due to the presence of the obstacle 70a.

Furthermore, as illustrated in FIG. 9, the display control module 102 may control the display device 120 to display thereon a second background image 51 transmitted from the server device 2. In this configuration, for example, the display control module 102 may cause display of a frame 700 so as to emphasize an object detected as the obstacle 70a by the region recognition module 205 of the server device 2. In addition, the display control module 102 may cause display of an image showing the driving route 8 or the driving area 800, superimposed on the second background image 51.

The driver of the vehicle 1 recognizes, from the notification screen, that even if the vehicle 1 drives along the driving route 8 the same as that of the teacher driving, the vehicle 1 cannot be parked in the parking slot 903 as a target. Thereafter, for example, the driver of the vehicle 1 may switch to parking by manual driving to park the vehicle 1. Alternatively, after the driver takes a measure such as removal of the obstacle 70a, the process may be started again from S201 in FIG. 8. Note that the display mode of the notification screen illustrated in FIG. 9 is an example, and is not limited thereto.

Here, the process of the sequence diagram illustrated in FIG. 8 is finished.

As described above, the server device 2 of the present embodiment detects the obstacles 70a and 70b in the parking lot 9, determines whether the vehicle 1 is drivable along the driving route 8 according to the positions of the obstacles 70a and 70b and the driving route 8 of the vehicle 1, and transmits the result of the determination of drivability to the parking assistance device 100 of the vehicle 1. Therefore, according to the server device 2 of the present embodiment, it is possible to determine whether the vehicle 1 can drive along the driving route 8 before the vehicle 1 starts to move on the basis of the registered driving route 8. Therefore, the driver of the vehicle 1 can grasp whether the vehicle 1 can drive along the driving route 8 before starting the automatic driving of the vehicle 1, and it is possible to save the trouble of redoing the parking due to impassability of the vehicle 1 caused by the obstacle 70a during driving.

In addition, the server device 2 of the present embodiment stores the first background image 211 obtained by capturing the parking lot 9 during the teacher driving of the vehicle 1, in association with the vehicle ID of the vehicle 1, and detects the obstacles 70a and 70b on the basis of the first background image 211, and the second background image 51 that is obtained by capturing the parking lot 9 upon starting the automatic driving of the vehicle 1. Therefore, according to the server device 2 of the present embodiment, it is possible to efficiently detect the obstacles 70a and 70b positioned in the parking lot 9 upon starting the automatic driving of the vehicle 1, on the basis of the state of the parking lot 9 during the teacher driving where the vehicle 1 has driven along the driving route 8 without any problem.

In addition, the server device 2 of the present embodiment extracts a difference between the first background image 211 and the second background image 51 to detect the obstacles 70a and 70b. Therefore, according to the server device 2 of the present embodiment, it is possible to highly accurately detect the obstacles 70a and 70b that are not positioned during the teacher driving and that are positioned upon starting the automatic driving of the vehicle 1. For example, according to the server device 2 of the present embodiment, objects located at the same positions from upon the teacher driving are not determined as the obstacles 70a and 70b, and therefore, it is possible to inhibit a criterion for notification given to the vehicle 1 from being excessively strict unnecessarily.

In addition, the server device 2 of the present embodiment detects the obstacles 70a and 70b on the basis of the first background image 211 and the second background image 51 that are captured by the fixed camera 5 installed in the parking lot 9. Unlike the in-vehicle cameras 16 mounted on the vehicle 1, the fixed camera 5 installed in the parking lot 9 does not move in position, and therefore, the shooting range and shooting angle does not change between the first background image 211 and the second background image 51. Therefore, according to the server device 2 of the present embodiment, a difference between the first background image 211 and the second background image 51 makes it possible to detect the obstacles 70a and 70b with high accuracy.

In addition, in another example of obstacle detection means by the server device 2 of the present embodiment, the obstacles 70a and 70b may be detected from an image obtained by capturing the parking lot 9 upon starting the automatic driving of the vehicle 1 by using image recognition. According to the server device 2 adopting such a configuration, it is possible to detect the obstacles 70a and 70b positioned in the parking lot 9 even if an image captured during the teacher driving of the vehicle 1 is not stored. In addition, when such a configuration is adopted as well, use of the image captured by the fixed camera 5 installed in the parking lot 9 makes it also possible to detect the obstacles 70a and 70b located far from a start position of the driving route 8, and the obstacles 70a and 70b can be detected at an earlier stage than when the obstacles 70a and 70b are detected only by the in-vehicle cameras 16 of the vehicle 1.

In addition, when the positions of the detected obstacles 70a and 70b are located in the driving area 800 through which the vehicle 1 passes when the vehicle 1 drives along the driving route 8, the server device 2 of the present embodiment determines that the vehicle 1 is not drivable along the driving route 8. Therefore, according to the server device 2 of the present embodiment, it is possible to determine the drivability, excluding the obstacle 70b or the like located at a position far from the driving area 800, and unnecessary output of the notification of undrivability can be inhibited.

In addition, the parking assistance device 100 of the present embodiment transmits the vehicle ID by which the vehicle 1 is identifiable, to the server device 2, receives the drivability information indicating whether the vehicle 1 can drive along the driving route 8, from the server device 2, and outputs the notification when the received drivability information indicates that the vehicle 1 cannot drive along the driving route 8. Therefore, according to the server device 2 of the present embodiment, it is possible to notify the driver of whether the vehicle 1 can drive along the driving route 8 before the vehicle 1 starts to move on the basis of the registered driving route 8.

In addition, the parking assistance device 100 of the present embodiment causes the display device 120 in the vehicle 1 to display, as the notification, the message M1 indicating that the automatic driving cannot be started due to the presence of the obstacle 70a. Therefore, according to the server device 2 of the present embodiment, the driver can grasp the presence of the obstacle 70a in the parking lot 9, before the vehicle 1 starts to move on the basis of the driving route 8, and the driver can consider to take a measure such as manual driving or movement of the obstacle 70a earlier.

Second Embodiment

In the first embodiment described above, the server device 2 records one driving area 800 for each vehicle 1. In a second embodiment, the server device 2 is configured to record a plurality of driving areas 800 for each vehicle 1.

The parking assistance system S100 of the present embodiment includes the in-vehicle system S1 and the infrastructure system S2, as in the first embodiment.

Likewise in the first embodiment, the infrastructure system S2 includes the fixed camera 5 and the server device 2. As in the first embodiment, the server device 2 includes the communication device 201, the ID management module 202, the vehicle detection module 203, the region recognition module 204, the region recognition module 205, the drivability determination module 206, the memory management module 207, and the storage unit 210.

As in the first embodiment, the in-vehicle system S1 includes the display device 120, the in-vehicle cameras 16, the parking assistance device 100, and the vehicle control system 18. As in the first embodiment, the parking assistance device 100 includes the communication device 101, the display control module 102, the driving information recording module 103, the image processing module 104, the correction module 105, and the storage unit 110.

The storage unit 210 of the server device 2 of the present embodiment is configured to store a plurality of the driving routes 8 for one vehicle ID.

FIG. 10 is a table illustrating an example of driving area information 212a according to the second embodiment. As illustrated in FIG. 10, in the driving area information 212a stored in the storage unit 210 of the present embodiment, the vehicle ID, a driving route ID, the priority order, and the driving area 800 in association with each other.

The driving route ID is identification information by which the driving route 8 for each vehicle ID is identifiable. The driving route ID is preferably unique for each vehicle ID. In the example illustrated in FIG. 10, two driving route IDs "R001" and "R002" are associated with the vehicle ID "001." In addition, three driving route IDs "R001," "R002," and "R003" are associated with the vehicle ID "003." The driving route ID "R001" associated with the vehicle ID "001" and the driving route ID "R001" associated with the vehicle ID "003" are different driving routes 8. The driving route ID is an example of driving route identification information in the present embodiment.

Note that the driving route ID is shared as the same ID between the server device 2 and the parking assistance device 100 of each vehicle 1. Either the server device 2 or the parking assistance device 100 may have a function of determining the driving route ID first. For example, upon the teacher driving of the vehicle 1, the driving information recording module 103 of the parking assistance device 100 may assign the driving route ID to the recorded driving route 8, and the communication device 101 may transmit the driving route ID to the server device 2. Alternatively, upon the teacher driving of the vehicle 1, the ID management module 202 of the server device 2 may assign the driving route ID to the driving route 8, and the communication device 201 may transmit the driving route ID to the parking assistance device 100.

In addition, the storage unit 210 of the present embodiment is configured to store the plurality of the driving routes 8 corresponding to one vehicle ID in order of priority. The priority is an order in which the drivability determination module 206 determines drivability of the driving route ID associated with each vehicle ID. When determining that the vehicle 1 can drive along any of the driving routes 8, the drivability determination module 206 does not determine drivability for the driving route 8 having a priority lower than that of the driving route 8 for which it is determined that the vehicle 1 can drive.

The priority may be input from the driver UI or the other operation unit by the driver, for example, when the driving route is recorded during the teacher driving. Alternatively, the priority may be automatically determined by the driving information recording module 103 of the parking assistance device 100, the ID management module 202 of the server device 2, or the like, on the basis of a criterion such as shortness in time required for parking.

Note that in FIG. 10, an item of the priority is provided separately from an item of the driving route ID, but when the driving route ID includes a numerical value, the number of the driving route ID may represent a height in the priority.

Although the driving area information 212a is illustrated in the form of one table in FIG. 10, an individual table may be generated for each vehicle ID. In addition, the driving area information 212a may be associated with the vehicle ID, the driving route ID, the priority, and the driving area 800 in a form other than the table.

In the present embodiment, the storage unit 210 may store a plurality of the first background images 211 for each of the vehicle ID and the driving route ID. For example, the storage unit 210 may store the vehicle ID and the driving route ID in association with the first background image 211.

Note that the parking slot 903 allocated to the vehicle 1 does not change even when the driving route IDs are different, and therefore, only one first background image 211 may be registered for each vehicle ID, as in the first embodiment.

The drivability determination module 206 of the present embodiment, which has the same functions as those in the first embodiment, determines a driving route 8 along which the vehicle 1 can drive, from among the plurality of driving routes 8 stored in the storage unit 210 and associated with the vehicle ID of each vehicle 1.

More specifically, when determining that the vehicle 1 is not drivable along a driving route 8 having the highest priority, of the driving routes 8 associated with the vehicle ID of the vehicle 1, the drivability determination module 206 determines another driving route along which the vehicle 1 can drive from among the plurality of driving routes 8. For example, the drivability determination module 206 determines whether each driving area 800 overlaps with the positions of the obstacles 70a and 70b, for the driving route IDs registered in the driving area information 212a in association with the vehicle ID of the vehicle 1, in descending order of the priority.

The communication device 201 of the present embodiment, which has the same functions as those in the first embodiment, transmits the driving route ID of the drivable driving route 8 of the plurality of driving routes 8 associated with the vehicle ID of the vehicle 1, to the parking assistance device 100. More specifically, the communication device 201 transmits the driving route ID of the driving route 8 along which the vehicle 1 can drive, determined by the drivability determination module 206, to the parking assistance device 100.

The memory management module 207 of the present embodiment, which has the same functions as those in the first embodiment, stores, in the storage unit 210, the driving area 800 that is recognized by the region recognition module 204, and the vehicle ID and the driving route ID that are identified by the ID management module 202, in association with each other as the driving area information 212a. Note that the processing may be performed by the region recognition module 204.

In addition, the memory management module 207 of the present embodiment may cause the storage unit 210 to record the first background image 211 associated with the vehicle ID, and the driving route ID of the driving route 8 recorded in the teacher driving, every time the teacher driving of the vehicle 1 is performed.

The storage unit 110 of the parking assistance device 100 according to the present embodiment is configured to store a plurality of driving routes 8 based on a plurality of teacher drivings. More specifically, the storage unit 110 of the present embodiment stores the steering/braking information and the surrounding image for each of the plurality of driving routes 8.

FIG. 11 is a table illustrating an example of steering/braking information 111a according to the second embodiment. As illustrated in FIG. 11, the steering/braking information 111a of the present embodiment may be, for example, a table in which the driving route ID, the priority order, the steering information, and the braking information are associated with each other. Note that the steering/braking information 111a may be information in which the driving route ID, the priority order, the steering information, and the braking information are associated in a form other than the table.

FIG. 12 is a table illustrating an example of association between the surrounding image 112, the driving route ID, and the priority according to the second embodiment. As illustrated in FIG. 12, the storage unit 110 may store surrounding image information 1112 in which the surrounding image 112 is associated with the driving route ID and the priority. The images captured by the in-vehicle cameras 16 of the vehicle 1 are different depending on the driving route 8 in the teacher driving, and therefore, the surrounding images 112 associated with the respective driving route IDs are different from each other.

Note that the surrounding image information 1112 may be information in which the surrounding image 112, the driving route ID, and the priority are associated in a form other than the table.

The communication device 101 of the parking assistance device 100 of the present embodiment, which has the same functions as those in the first embodiment, receives the driving route ID indicating a driving route 8 along which the vehicle 1 can drive from among the plurality of driving routes 8, from the server device 2.

The display control module 102 of the parking assistance device 100 of the present embodiment, which has the same functions as those in the first embodiment, outputs a notification indicating the driving route 8 along which the vehicle 1 can drive, on the basis of the driving route ID received by the communication device 101 from the server device 2.

Figure 13:
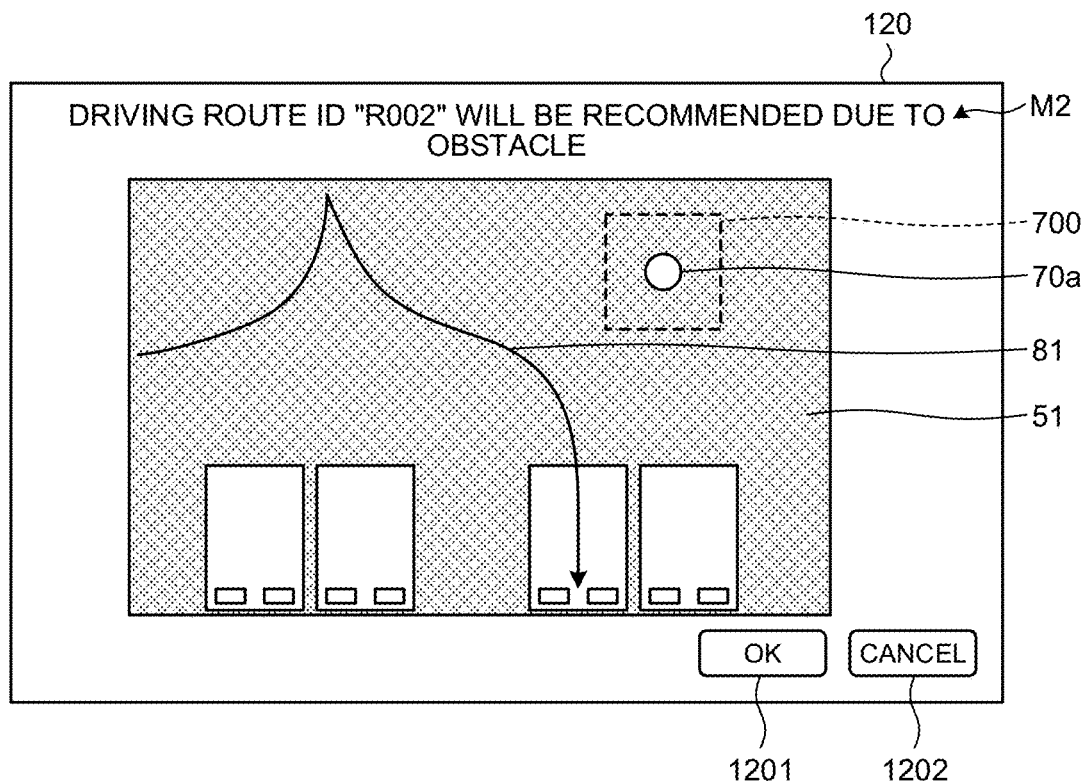
FIG. 13 is a diagram illustrating an example of a notification screen displaying a drivable driving route according to the second embodiment.

FIG. 13 is a diagram illustrating an example of a notification screen showing the drivable driving route 8 according to the second embodiment. As illustrated in FIG. 13, the display control module 102 controls the display device 120 to display a message M2 that indicates that the obstacle 70a is located and that shows the driving route 8 along which the vehicle 1 can drive.

Furthermore, as illustrated in FIG. 13, the display control module 102 may control the display device 120 to display thereon the second background image 51 transmitted from the server device 2. In addition, the display control module 102 may cause display of the frame 700 so as to emphasize the object detected as the obstacle 70a by the region recognition module 205 of the server device 2.

In addition, as illustrated in FIG. 13, the display control module 102 of the present embodiment may cause display of a driving route image 81 indicating the driving route 8 along which the vehicle 1 can drive, on the second background image 51.

The driving route image 81 may be, for example, an image based on the shape of the driving route 8 recognized by the region recognition module 204 of the server device 2. In this configuration, the communication device 201 of the server device 2 transmits the shape of the driving route 8 recognized by the region recognition module 204, to the parking assistance device 100. Alternatively, the display control module 102 may estimate the shape of the driving route 8 on the basis of the steering/braking information 111a from the parking assistance device 100 to cause display of the estimated shape of the driving route 8 aligned with the second background image 51. An alignment reference is, for example, the entrance of the parking lot 9 that is the start position of the driving route 8, the parking slot 903 that is an end position of the driving route 8, and the like.

As illustrated in FIG. 13, the display control module 102 of the present embodiment may cause display of an OK button 1201 and a cancel button 1202 on the notification screen showing the drivable driving route 8.

The OK button 1201 is an image button configured to receive a driver's operation to approve the start of the automatic driving along a recommended driving route indicated by the message M2. When the OK button 1201 is pressed by the driver, the correction module 105 of the parking assistance device 100 reads the steering information and the braking information corresponding to the recommended driving route "R002" indicated by the message M2, of the steering information and the braking information registered in the steering/braking information 111, and corrects the steering information and the braking information according to a situation around the vehicle 1. The correction module 105 transmits the corrected steering/braking information 111 to the vehicle control system 18 to start parking assistance by automatic driving.

The cancel button 1202 is an image button configured to receive a driver's operation to finish the parking assistance by automatic driving. When the cancel button 1202 is pressed, the parking assistance is finished. In this case, the driver may park the vehicle 1 in the parking slot 903, for example, by manual driving.

Note that the configuration of the notification screen illustrated in FIG. 13 is an example, and is not limited thereto.

In addition, when the drivability determination module 206 of the server device 2 determines that the vehicle 1 is not drivable along any of the driving routes 8, the display control module 102 may control the display device 120 to display a notification screen by which no drivable driving route and proposal to switching to manual driving are notified.

As described above, the server device 2 of the present embodiment is configured to store the plurality of driving routes 8 for one vehicle ID, and determines the driving route 8 along which the vehicle 1 can drive from among the plurality of driving routes 8. The server device 2 of the present embodiment transmits the driving route ID indicating the drivable driving route 8 of the plurality of driving routes 8, to the parking assistance device 100. Therefore, according to the server device 2 of the present embodiment, which has the same effects as those in the first embodiment, it is possible to propose a driving route 8 along which the vehicle 1 can drive, even when the obstacle 70a is positioned in the vicinity of any of the driving routes 8.

In addition, the server device 2 of the present embodiment is configured to store the plurality of driving routes 8 corresponding to one vehicle ID in order of priority, and when it is determined that the vehicle 1 is not drivable along the driving route 8 having the highest priority, of the plurality of driving routes 8, the server device 2 determines another driving route 8 along which the vehicle 1 can drive, from among the plurality of driving routes 8. The server device 2 of the present embodiment transmits, to the parking assistance device 100, a driving route ID indicating a driving route determined as the other driving route 8 along which the vehicle 1 can drive, from among the plurality of driving routes 8. Therefore, according to the server device 2 of the present embodiment, when the plurality of driving routes 8 are registered, the recommended driving route can be efficiently identified.

In addition, the parking assistance device 100 of the present embodiment stores the plurality of driving routes 8 based on the plurality of teacher drivings, and receives the driving route ID indicating the driving route 8 along which the vehicle 1 can drive from among the plurality of driving routes 8, from the server device 2. The server device 2 of the present embodiment outputs the notification indicating the driving route 8 along which the vehicle 1 can drive, on the basis of the received driving route ID. Therefore, according to the parking assistance device 100 of the present embodiment, it is possible to propose the drivable driving route 8 to the driver, according to the situation of the parking lot 9 upon starting the parking assistance.

First Modification

In the embodiments described above, an example of one fixed camera 5 installed in the parking lot 9 has been described, but a plurality of the fixed cameras 5 may be installed in the parking lot 9. For example, in a case where the parking lot 9 is wider than a shooting range of one fixed camera 5, or in a case where the parking lot 9 is divided into a plurality of floors, a plurality of fixed cameras 5 is installed in one parking lot 9, in some cases.

Figure 14:
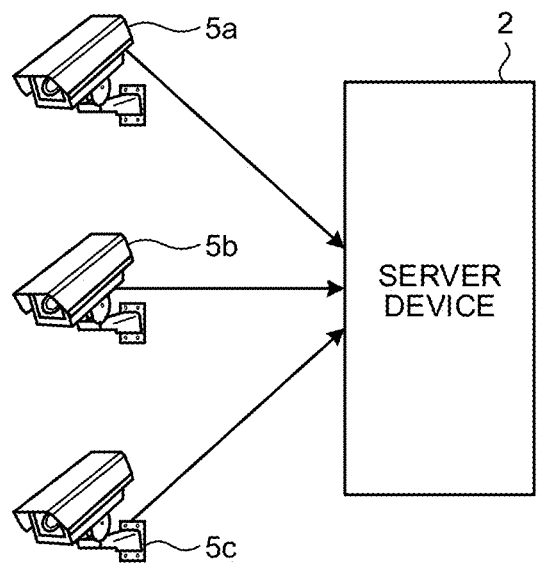
FIG. 14 is a diagram illustrating an exemplary relationship between fixed cameras and a server device according to a first modification.

FIG. 14 is a diagram illustrating an exemplary relationship between fixed cameras 5a to 5c and the server device 2 according to a first modification. As illustrated in FIG. 14, each of the fixed cameras 5a to 5c is configured to communicate with the server device 2, and transmits a captured image to the server device 2. For example, it is assumed that each of the fixed cameras 5a to 5c is configured to be identified by identification information such as a camera ID.

The vehicle detection module 203, the region recognition module 204, the region recognition module 205, and the memory management module 207 of the present modification use images captured by the respective fixed cameras 5a to 5c, for processing.

For example, the vehicle detection module 203 of the present modification detects the vehicle 1 from a plurality of images captured in time series by the plurality of fixed cameras 5a to 5c during the teacher driving of the vehicle 1.

In addition, the region recognition module 204 of the present modification recognizes the driving area 800 of the vehicle 1 in the parking lot 9, on the basis of a change in position of the vehicle 1 during the teacher driving detected by the vehicle detection module 203.

In addition, the region recognition module 205 of the present modification detects the obstacles 70a and 70b, on the basis of the first background image 211 and the second background image 51 captured by each of the fixed cameras 5a to 5c. The first background image 211 and the second background image 51 that are to be compared with each other are images captured by the same fixed camera 5.

For example, the region recognition module 205 extracts a difference between the first background image 211 captured by the fixed camera 5a and the second background image 51 captured by the fixed camera 5a to detect the obstacles 70a and 70b. Furthermore, the region recognition module 205 extracts a difference between the first background image 211 captured by a fixed camera 5b and the second background image 51 captured by the fixed camera 5b to detect the obstacles 70a and 70b. The region recognition module 205 extracts a difference between the first background image 211 captured by the fixed camera 5c and the second background image 51 captured by the fixed camera 5c to detect the obstacles 70a and 70b.

In addition, the memory management module 207 of the present modification stores, in the storage unit 210, the camera ID by which each of the fixed cameras 5a to 5c can be identified, the driving area 800 recognized for each of the fixed cameras 5a to 5c by the region recognition module 204, and the vehicle ID identified by the ID management module 202, in association with each other as the driving area information 212.

In addition, the memory management module 207 of the present modification causes the storage unit 210 to record the first background image 211 captured by each of the fixed cameras 5a to 5c in association with the camera ID and the vehicle ID.

The vehicle detection module 203, the region recognition module 204, the region recognition module 205, and the memory management module 207 may be separately provided, exclusively for each of the fixed cameras 5a to 5c. For example, the server device 2 may be provided with three vehicle detection modules 203, three region recognition modules 204, three region recognition modules 205, and three memory management modules 207, as many as the number of fixed cameras 5a to 5c. Alternatively, one vehicle detection module 203, region recognition module 204, region recognition module 205, and memory management module 207 may perform processing, for each of the plurality of fixed cameras 5a to 5c.

According to the parking assistance device 100 and the server device 2 of the present modification, even in a case where the parking lot 9 is wider than the shooting range of one fixed camera 5 or in a case where the parking lot 9 is divided into a plurality of floors, it is possible to notify the driver of the vehicle 1 of whether the vehicle 1 can drive along the driving route 8 before starting the automatic driving of the vehicle 1. Note that the fixed cameras 5a to 5c are not limited in number to the example illustrated in FIG. 14.

Second Modification

The fixed camera 5 may have functions described as the functions of the server device 2 in the embodiments described above. In other words, the ID management module 202, the vehicle detection module 203, the region recognition module 204, the region recognition module 205, the drivability determination module 206, the memory management module 207, and the storage unit 210 may be provided inside the fixed camera 5. In a case where this configuration is adopted, the fixed camera 5 is an example of the information processing device.

Furthermore, as described in the first modification, when the plurality of fixed cameras 5a to 5c are provided in the parking lot 9, each of the fixed cameras 5a to 5c may include the ID management module 202, the vehicle detection module 203, the region recognition module 204, the region recognition module 205, the drivability determination module 206, the memory management module 207, and the storage unit 210.

Third Modification

In the embodiments described above, the timing of capturing the first background image is set before the start of the teacher driving, but the timing of capturing the first background image may be after the end of the teacher driving.

Fourth Modification

In the embodiments described above, the drivability determination module 206 determines that the vehicle 1 is not drivable along the driving route 8 when the detected positions of the obstacles 70a and 70b are located in the driving area 800, but a criterion for determination is not limited thereto. For example, even if the obstacles 70a and 70b are not located in the driving area 800, the drivability determination module 206 may determine that the vehicle 1 is not drivable along the driving route 8 when a distance between the outline of the driving area 800 and each of the obstacles 70a and 70b is equal to or less than a prescribed distance. The prescribed distance is not particularly limited, and may be set in advance by, for example, an administrator or the like of the infrastructure system S2.

Fifth Modification

In the second embodiment described above, it has been described that the storage unit 210 stores the plurality of driving routes 8 corresponding to one vehicle ID in order of priority, but the storage unit 210 may store the plurality of driving routes 8 regardless of the priority. In this configuration, the drivability determination module 206 of the server device 2 may determine the drivability for all the driving routes 8 associated with the vehicle ID of the vehicle 1 that has transmitted the parking assistance start signal.

Sixth Modification

In the embodiments described above, it has been described that the display device 120 and the in-vehicle cameras 16 are not included in the parking assistance device 100, but a configuration in which the parking assistance device 100 includes the display device 120 and the in-vehicle cameras 16 may be adopted.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing device comprising:
a communication unit configured to receive, from a plurality of vehicles performing an automatic driving in a parking lot along a driving route to a specific location recorded based on teacher driving by a driver, vehicle identification information by which the plurality of vehicles are identifiable; and a processor configured to:
  detect an obstacle; and
  determine whether a vehicle identified from the plurality of vehicles based on the received vehicle identification information is drivable along the driving route, according to the driving route of the identified vehicle and a position of the detected obstacle, wherein
the communication unit is configured to transmit a result of determination of drivability to the in-vehicle device.

2. The information processing device according to claim 1, wherein
the processor is further configured to:
  cause a storage unit to record a first background image obtained by capturing the parking lot during the teacher driving of the vehicle, in association with the vehicle identification information; and
  detect the obstacle, based on the first background image and a second background image obtained by capturing the parking lot upon starting the automatic driving of the vehicle.

3. The information processing device according to claim 2, wherein
the processor is configured to extract a difference between the first background image and the second background image to detect the obstacle.

4. The information processing device according to claim 1, wherein
the processor is configured to detect the obstacle by image recognition, from an image obtained by capturing the parking lot upon starting the automatic driving of the vehicle.

5. The information processing device according to claim 1, wherein
the processor is configured to determine that the vehicle is not drivable along the driving route, when the position of the detected obstacle is in a driving area through which the vehicle passes when the vehicle drives along the driving route.

6. The information processing device according to claim 2, wherein
the processor is configured to determine that the vehicle is not drivable along the driving route, when the position of the detected obstacle is in a driving area through which the vehicle passes when the vehicle drives along the driving route.

7. The information processing device according to claim 3, wherein
the processor is configured to determine that the vehicle is not drivable along the driving route, when the position of the detected obstacle is in a driving area through which the vehicle passes when the vehicle drives along the driving route.

8. The information processing device according to claim 4, wherein
the processor is configured to determine that the vehicle is not drivable along the driving route, when the position of the detected obstacle is in a driving area through which the vehicle passes when the vehicle drives along the driving route.

9. The information processing device according to claim 2, wherein
the storage unit is configured to store a plurality of driving routes for one piece of the vehicle identification information,
the processor is configured to determine a driving route along which the vehicle is drivable from among the plurality of driving routes, and
the communication unit is configured to transmit, to the in-vehicle device, driving route identification information indicating the driving route along which the vehicle is drivable from among the plurality of driving routes.

10. The information processing device according to claim 9, wherein
the storage unit is configured to store the plurality of driving routes corresponding to the one piece of the vehicle identification information in order of priority,
when determining that the vehicle is not drivable along a driving route having highest priority among the plurality of driving routes, the processor is configured to determine another driving route along which the vehicle is drivable, from among the plurality of driving routes, and
the communication unit is configured to transmit, to the in-vehicle device, driving route identification information indicating a driving route determined as the another driving route along which the vehicle is drivable, from among the plurality of driving routes.

11. The information processing device according to claim 1, wherein
the processor is configured to detect the obstacle, based on an image captured by a fixed camera installed in the parking lot.

12. The information processing device according to claim 2, wherein
the processor is configured to detect the obstacle, based on an image captured by a fixed camera installed in the parking lot.

13. The information processing device according to claim 3, wherein
the processor is configured to detect the obstacle, based on an image captured by a fixed camera installed in the parking lot.

14. The information processing device according to claim 4, wherein
the processor is configured to detect the obstacle, based on an image captured by a fixed camera installed in the parking lot.

15. A parking assistance device performing parking assistance by automatic driving of a vehicle along a driving route to a specific location recorded based on teacher driving by a driver, the parking assistance device comprising:
  a communication unit configured to transmit vehicle identification information of the vehicle, by which the vehicle is identifiable among a plurality of vehicles performing automatic driving in a parking lot, to an information processing device, and receive information indicating drivability of the vehicle identified, among the plurality of vehicles based on the vehicle identification information, along the driving route of the identified vehicle from the information processing device; and
  a processor configured to output a notification when the received information indicates that the vehicle is not drivable along the driving route.

16. The parking assistance device according to claim 15, wherein
the processor is configured to cause a display unit in the vehicle to display a message, as the notification, indicating that the automatic driving is not able to be started due to presence of an obstacle.

17. The parking assistance device according to claim 15, further comprising:
a storage unit configured to be able to store a plurality of driving routes based on a plurality of teacher drivings, wherein
the communication unit is configured to receive, from the information processing device, driving route identification information indicating a driving route along which the vehicle is drivable from among the plurality of driving routes, and
the processor is configured to output a notification indicating a driving route along which the vehicle is drivable, based on the received driving route identification information.

18. The parking assistance device according to claim 16, further comprising:
a storage unit configured to be able to store a plurality of driving routes based on a plurality of teacher drivings, wherein
the communication unit is configured to receive, from the information processing device, driving route identification information indicating a driving route along which the vehicle is drivable from among the plurality of driving routes, and
the processor is configured to output a notification indicating a driving route along which the vehicle is drivable, based on the received driving route identification information.

19. A method comprising:
receiving, from a plurality of vehicles performing an automatic driving in a parking lot along a driving route to a specific location recorded based on teacher driving by a driver, vehicle identification information by which the plurality of vehicles are identifiable;
detecting an obstacle;
determining whether a vehicle identified from the plurality of vehicles based on the received vehicle identification information is drivable along the driving route, according to the driving route of the identified vehicle and a position of the detected obstacle; and
transmitting a result of determination of drivability to the in-vehicle device.

20. The information processing device according to claim 1, further comprising:
a storage that stores the vehicle identification information in association with a driving area which is an area through which a vehicle body of the vehicle passes when the vehicle drives along the driving route.

21. The information processing device according to claim 20, wherein
the processor determines whether the received vehicle identification information is included in a vehicle identification information registered in advance in the storage.

* * * * *